US008615151B2

(12) United States Patent
Rinko

(10) Patent No.: US 8,615,151 B2
(45) Date of Patent: Dec. 24, 2013

(54) LIGHTGUIDE ARRANGEMENT AND RELATED APPLICATIONS

(75) Inventor: Kari Rinko, Helsinki (FI)

(73) Assignee: Modilis Holdings LLC, Wilmington, DE (US)

( * ) Notice: Subject to any disclaimer, the term of this patent is extended or adjusted under 35 U.S.C. 154(b) by 564 days.

(21) Appl. No.: 11/984,164

(22) Filed: Nov. 14, 2007

(65) Prior Publication Data
US 2008/0186736 A1 Aug. 7, 2008

Related U.S. Application Data

(60) Provisional application No. 60/858,708, filed on Nov. 14, 2006, provisional application No. 60/907,210, filed on Mar. 26, 2007.

(51) Int. Cl.
*G02B 6/10* (2006.01)
*F21V 7/04* (2006.01)

(52) U.S. Cl.
USPC ........... 385/131; 385/901; 362/606; 362/607; 362/613

(58) Field of Classification Search
USPC .................................. 362/602–607
See application file for complete search history.

(56) References Cited

U.S. PATENT DOCUMENTS

| | | | |
|---|---|---|---|
| 4,601,861 A | 7/1986 | Pricone et al. | |
| 5,061,027 A | 10/1991 | Richard | |
| 5,978,524 A * | 11/1999 | Bischel et al. | 385/4 |
| 6,598,987 B1 * | 7/2003 | Parikka | 362/26 |
| 6,759,965 B1 * | 7/2004 | Hatjasalo et al. | 340/815.4 |
| 6,861,600 B1 | 3/2005 | Schulz et al. | |
| 6,965,205 B2 * | 11/2005 | Piepgras et al. | 315/318 |
| 7,114,820 B1 * | 10/2006 | Parikka et al. | 362/602 |
| 2005/0052732 A1 * | 3/2005 | Chen et al. | 359/369 |
| 2006/0083476 A1 | 4/2006 | Winkler | |
| 2006/0207134 A1 * | 9/2006 | Harry | 40/453 |
| 2006/0254894 A1 * | 11/2006 | Jung et al. | 200/314 |
| 2006/0256092 A1 * | 11/2006 | Lee | 345/173 |
| 2007/0133935 A1 * | 6/2007 | Fine | 385/131 |
| 2007/0139965 A1 * | 6/2007 | Liao | 362/615 |
| 2007/0243844 A1 * | 10/2007 | Cunningham et al. | 455/255 |

(Continued)

FOREIGN PATENT DOCUMENTS

| | | |
|---|---|---|
| EP | 0884525 A2 | 12/1998 |
| EP | 1 152 443 A2 | 11/2001 |

(Continued)

OTHER PUBLICATIONS

International Preliminary Report on Patentability, dated Feb. 17, 2009, issued in connection with counterpart International Patent Application No. PCT/FI2007/050614.

(Continued)

*Primary Examiner* — Hemang Sanghavi
(74) *Attorney, Agent, or Firm* — Lee & Hayes, PLLC

(57) ABSTRACT

A lightguide arrangement including a substantially thin, lightguide for transporting and coupling light. At least one light source is coupled to the lightguide. A plurality of micro-optic surface relief forms are arranged on the lightguide. The lightguide is configured to produce one or more active indicative and/or decorative illumination effects via interaction between the one or more light sources and the plurality of micro-optic surface relief forms. A keypad assembly including the lightguide and uses of lightguide constructions.

19 Claims, 15 Drawing Sheets

(56) References Cited

U.S. PATENT DOCUMENTS

| | | | |
|---|---|---|---|
| 2008/0310185 A1* | 12/2008 | Oliver et al. | 362/602 |
| 2009/0129115 A1* | 5/2009 | Fine et al. | 362/606 |
| 2009/0196071 A1* | 8/2009 | Matheson et al. | 362/623 |
| 2011/0255303 A1* | 10/2011 | Nichol et al. | 362/606 |

FOREIGN PATENT DOCUMENTS

| | | |
|---|---|---|
| EP | 1 722 385 A1 | 11/2006 |
| JP | 11015393 | 1/1999 |
| JP | 2001167655 A | 6/2001 |
| JP | 2004069751 A | 3/2004 |
| JP | 2005084620 | 3/2005 |
| JP | 2006075362 | 3/2006 |
| WO | WO 2005/107363 A2 | 11/2005 |
| WO | WO 2007/097117 A1 | 8/2007 |
| WO | WO 2007/100180 A1 | 9/2007 |

OTHER PUBLICATIONS

International Search Report, dated Mar. 19, 2008, issued in connection with counterpart International Patent Application No. PCT/FI2007/050614.

Written Opinion of the International Searching Authority, dated Mar. 19, 2008, issued in connection with counterpart International Patent Application No. PCT/FI2007/050614.

Chinese Office Action mailed Sep. 6, 2011 for Chinese patent application No. 200780047323.4, a counterpart foreign application of U.S. Appl. No. 11/984,164, 3 pages.

Redacted Letter including Summary of Chinese Office Action dated Sep. 6, 2011 from foreign associate, 2 pages, dated Sep. 15, 2011.

Russian Office Action mailed Nov. 11, 2011, for Russian patent application No. 2009123393, a counterpart foreign application of U.S. Appl. No. 11/984,164, 12 pages.

Japanese Office Action mailed Mar. 19, 2013 for Japanese patent application No. 2009535762, a counterpart foreign application of U.S. Appl. No. 11/984,164, 8 pages.

* cited by examiner

LIGHTGUIDE ARRANGEMENT AND RELATED APPLICATIONS

CROSS-REFERENCE TO RELATED APPLICATIONS

This application claims priority to U.S. provisional patent application 60/858,708 filed Nov. 14, 2006, and U.S. provisional patent application 60/907,210 filed Mar. 26, 2007, the entire contents of the disclosures of which are hereby incorporated by reference.

FIELD OF THE INVENTION

Generally the invention relates to optics. In particular, the invention pertains to applications of lightguide arrangements for transporting and coupling light via micro-optic surface relief structures, and to manufacturing such lightguide arrangements.

BACKGROUND

Lightguides are typically used for guiding light from light sources in various lighting solutions. The lightguides can be used for display lighting (e.g. backlighting, frontlighting), keypad, keyboard and/or button lighting, interior lighting, and exterior lighting, among other applications. Conventional lightguides that are considered as thin may have a thickness of about 0.8 to about 1.0 mm and include micro-optical structures. Such microstructures are often on the order of about 15 microns in height or more, and on the order of about 50 microns or more in one lateral dimension.

FIG. 1 illustrates a lightguide 102 including a plurality of micro-optical structures 106 implemented as surface relief forms on one side of the lightguide 102 for outcoupling 108 light emitted by a light source 104 and transported in the lightguide 102 by total reflection. In the example of FIG. 1, light is outcoupled from the lightguide 102 via a top surface opposite to the bottom surface including the illustrated micro-optical structures 106. The lightguides are often application-specific such that a desired illumination pattern formed by outcoupled light can be precisely obtained.

Now referring to FIG. 2, conventional keypad, keyboard and console lighting typically includes 3-8 LEDs (light-emitting diode) as light sources and a relatively thick lightguide 206 having apertures for each key 202 to enable establishing the associated electrical contact. These designs may include electric circuitry in connection with a dome sheet 208 that includes a plurality of thin metal domes, one per each key or button 202. When pushing the hard/rigid top of the key 202 of a key mat, which makes the flexible and soft, e.g. silicone, plunger 210 of the underlying soft silicone layer 204 to protrude towards the dome sheet 208, the thin metal dome on the sheet 208 is bent and flattened making the intended electrical contact on the surface of the electric circuitry, for example. The domes also provide tactile feeling with a "click" effect and the apertures are needed to provide such function. However, these apertures make it difficult to manage light in order to achieve e.g. uniform keypad lighting. The resulting keypad arrangement may also be impractically thick relative to the initial design goal as the soft material plungers 210 have to be rather thick so as to reach through the thick lightguide 206 and actuate the dome. Additionally rigid plungers cause defects and damages for the dome sheet layers, thus soft silicone plungers are used.

Lightguides may be manufactured according to a number of different processes. Lightguide layer production can be completed by means of continuous roll replication, or "roll-to-roll" replication, for example. Using this manufacturing method bulk material, such as optically transparent plastic film, may be utilized in surface relief replication. Different roll-to-roll methods are prior known and feasible for manufacturing micro-optic surface relief forms (e.g. structures), either refractive or diffractive, for many different applications. Several roll-to-roll methods are available, such as the ones by Reflexite, Avery Dennison, 3M, Epigem, Rolltronics, Polymicro, Printo project, among others. Other suitable production methods may include continuous or discrete casting methods (UV or thermal curing), compression molding, continuous or discrete embossing, such as hard embossing, soft embossing and UV embossing, among others. Melt film can also be used.

One drawback of many roll-to-roll embossing methods is illustrated in FIG. 3. Namely, as two rollers 310, 312, in this example the former of which having a circular cross-section and the latter a circular cross-section excluding two opposite segments, introduce pressure to a flexible lightguide bulk material 314 advanced between them, the bulk material 314 is replicated with an optical surface relief structure of the roller 312, for example. However, it can readily be seen from the visualization of phase 302 how the soft bulk material 314 starts to pile up during the nip pressure (arrows marked with p) and the input speed v1 begins to decrease compared to output speed v0 as the material 314 deforms. The same situation continues in phases 304, 306 until in phase 308 the input speed v1 temporarily again increases due to end of nip pressure segment of the roller 312 and matches speed v0, after which the same cycle of aforesaid phases is repeated. An elongated lightguide may be produced as a result, for example. Such phenomenon creates artifacts in the replicated optical micro-structures as material 314 deformation cannot be properly taken into account in the replication process.

SUMMARY OF THE INVENTION

The objective of embodiments of the present invention is to at least alleviate aforesaid drawbacks evident in the prior art arrangements.

According to one aspect of the present invention, a lightguide arrangement includes
  a substantially thin, typically flexible, lightguide for transporting and coupling light,
  one or more light sources coupled to the lightguide,
  a plurality of micro-optic surface relief forms arranged on the lightguide, the lightguide being configured to produce one or more active indicative and/or decorative illumination effects via interaction between the one or more light sources and the plurality of micro-optic surface relief forms.

For example, the above or some other lightguide may be included in a keypad assembly for an electronic apparatus in which case the assembly may include
  a lightguide for transporting and coupling light,
  a plurality of keys disposed on one side of the lightguide, each key associated with a rigid actuation member facing the lightguide,
  a dome sheet disposed on opposite side of the lightguide, the dome sheet including a plurality of bendable domes positioned so that upon depressing a predetermined key, a corresponding, predetermined dome is deformed by pressure introduced by the rigid actuation member of the predetermined key via the lightguide in order to perform an associated event such as opening or closing an electrical switch, wherein at least the portion of the lightguide residing between the predetermined dome and the predetermined key may be arranged at least optically substantially continuous, thin and typically flexible so as to provide improved tactile feeling to a user of the keypad upon key actuation. Additionally, the lightguide may provide a protecting layer for the dome sheet against the rigid actuation member.

In another aspect of the present invention, a multi-purpose lightguide element configured to outcouple collimated light therefrom may be used as at least functionally integrated with an application-specific optically functional element, such as a key mat of an electronic apparatus, so that the optically functional element is configured to diffuse the collimated light outcoupled by the multi-purpose light guide element in a controlled, e.g. location-specific, manner.

The multi-purpose lightguide element may be first extracted, for example cut, from a larger piece of multi-purpose micro-optic material.

In a further aspect of the present invention a stiffer and optionally optically functional, thinner element may be used to support a flexible, e.g. elastic, and optically substantially transparent lightguide element by integrating the two prior to or upon roll-to-roll embossing of micro-optic surface relief forms in the integrated entity so as to manufacture an integrated, flexible lightguide element substantially free or at least having a reduced amount of artifacts in the embossed micro-optic surface relief forms in contrast to artifacts arising from merely roll-to-roll embossing the flexible element.

The micro-optic surface relief forms may be embossed to either one of the above two source elements, e.g. flexible, such as elastic and/or bendable, element and the stiff(er) element. Alternatively, both source elements may be embossed, either simultaneously or sequentially, with micro-optic surface relief forms.

The utility of embodiments of the present invention may arise from a plurality of issues depending on each particular embodiment. A thin lightguide according to one aspect of the present invention may be used for creating one or more active indicative and/or decorative illumination effects via interaction between one or more, e.g. two or three, light sources incoupled to the thin lightguide and one or more micro-optic surface relief forms, e.g. different micro-optic patterns, of the lightguide. The thin lightguide may be configured to provide illumination effects, such as gradually or stepwise brightness-and/or color-changing indicators that may be controlled by a host device such as a mobile terminal via associated processing means according to a predetermined criterion; the indicator may be configured to visualize internal status information or e.g. a selected, current parameter value of the device, for example. An indicative illumination effect may further be obtained by utilizing a keymat together with the lightguide. Active decorative effects may be controlled by the host device, may include various symbols, graphical shapes or other forms. Both the effect types may be at least partly defined by the corresponding micro-optic surface relief patterns on the lightguide. Additionally, mask(s) may be used to prevent light entering and/or penetrating predetermined areas. One or more similar or different (e.g. emitting different color) light sources such as LEDs may be applied to provide active brightness (illumination level) and/or color adjustment to the effects (brightness/color fading relative to time and/or location on the lightguide, for example). Various "live" or "animated" effects, such as waterfall or fire shapes, may be obtained. The present invention provides very flexible and integrated solution for active low cost illumination in contrast to conventional indicative and decorative illumination effects that are typically provided with more expensive and complex display solutions.

Lightguides in accordance with the embodiments of the present invention may include diffractive and/or refractive micro-optic surface relief forms such as grating grooves, recesses, or protrusions with different cross-sectional shapes to be reviewed later herein. The dimensions (height, cross-sectional length, etc) of such forms may be on the order of about 10 microns or less, for example.

A thin keypad assembly may be obtained without introducing apertures in the lightguide for the rigid actuation members such as key plungers. As such apertures typically may also reduce the overall optical efficiency of the assembly, the obtained optical efficiency may be increased by the invention with respect to typical prior art solutions. Further, the obtained tactile feel is good and in many cases improved in relation to prior art solutions; soft/flexible/thin lightguide layers enable delicate pressure transfer through them while the increased rigidity of the actuation members still provides well-targeted pressure on the domes. The lightguide positioned between the domes and the rigid actuation member on the other hand protects the domes from overpressure.

The multi-purpose lightguide element in accordance with one aspect of the present invention can enable manufacturing application-specific illumination elements both cost-effectively and rapidly, as a more generic, highly directive/collimating light coupling structure may be first manufactured, optionally stored and later tailored (cut to size and optionally otherwise treated, for example) for each application wherein an application-specific optically functional element such as a diffuser, for example, is integrated with the multi-purpose element.

Further, flexible, possibly elongated or planar, lightguide solutions that may be applied in various embodiments of the present invention may be provided with precisely embossed micro-optic surface relief patterns by applying the improved roll-to-roll embossing technique according to an embodiment of the present invention, wherein a thin, additional layer is integrated with the more flexible and softer initial lightguide layer. The additional layer may further be optically functional or may be made as optically functional.

The expression "thin" may, in the context of the lightguides according to embodiments of the present invention, refer to thicknesses between about 25 and about 500 microns, e.g. about 100 microns, for example.

The expression "keypad" is in the context of the present invention considered as analogous to "keyboard" or a corresponding arrangement of a number of keys (or buttons). Any number of keys may be included.

The expression "dome" may, in the context of the present invention, refer in addition to mere hemi-spherical or portions of hemi-spherical surface forms also other surface forms that are suitable for carrying out corresponding pressure-related functions of a keypad assembly.

BRIEF DESCRIPTION OF THE RELATED DRAWINGS

FIG. 1 illustrates one example of a prior art lightguide.
FIG. 2 illustrates one example of a prior art keypad assembly.
FIG. 3 illustrates problems associated with prior art manufacturing of flexible lightguides by roll-to-roll embossing.
FIG. 4a illustrates one embodiment of a keypad assembly in accordance with the present invention.

FIG. 13b illustrates one application of the embodiment of FIG. 13a.

FIG. 15b illustrates one application of the embodiment of FIG. 15a.

DETAILED DESCRIPTION OF EMBODIMENTS OF THE INVENTION

Figure 4A:
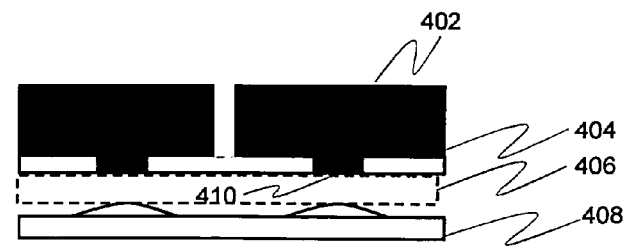
FIG. 4b illustrates another embodiment of a keypad assembly in accordance with the present invention.
FIG. 4c illustrates a further embodiment of a keypad assembly in accordance with the present invention.
FIG. 4d illustrates still a further embodiment of a keypad assembly in accordance with the present invention.
FIG. 4e illustrates one embodiment of lightguide-integrated dome sheet.
FIG. 4f illustrates one embodiment wherein at least part of the rigid and transparent actuation member is integrated with the lightguide.

FIG. 4a illustrates one embodiment of the keypad assembly in accordance with the present invention. The keys may be provided as an aggregate entity, such as a key mat, wherein the independent key forms 402 may include a hard top and rigid, either integral, integrated, or otherwise connected, actuation member, such as a plunger 410 slightly protruding from the key structure towards a lightguide 406 (and an underlying dome of the dome sheet 408) whereas a flexible member 404 such as soft material, e.g. silicone, pieces or a layer may be provided to arrange a predetermined, necessary amount of elasticity required between the adjacent keys so that a desired key 402 may be actuated by the user of the keypad. In this particular example the plunger 410 is substantially as thick or, of substantially same "height", as the surrounding flexible member 404 forming flat surface as can been observed from the FIG. 4a. As the lightguide 406 is thin and typically flexible, it may be constructed as continuous without apertures for plungers 410 and it is configured to bend (it is thus flexible and/or elastic) over the domes, i.e. on top of the uneven underlying layer such as the dome sheet 408, for example.

Figure 4B:
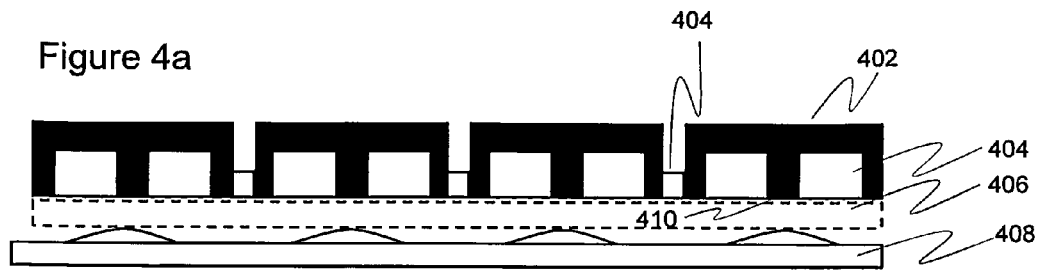

FIG. 4b illustrates another embodiment of a keypad assembly in accordance with the present invention. In this particular example one or more keys 402 include hollow portions that are filled with elastic material/flexible member 404, such as silicone also provided between the adjacent key 402 forms. Alternatively, materials of elastic members 404 between the key forms 402 and inside the keys 402 may be different. In contrast with the previous embodiment the carved keys 402 may include a rigid, "flat" actuation member, such as a plunger 410, that does not substantially protrude from the overall key form 402 but is surrounded by more elastic material 404 within the key skeleton instead so that the pressing force introduced to the key 402 may still be conveyed towards the dome of the dome sheet 408 via the light guide 406.

Figure 4C:
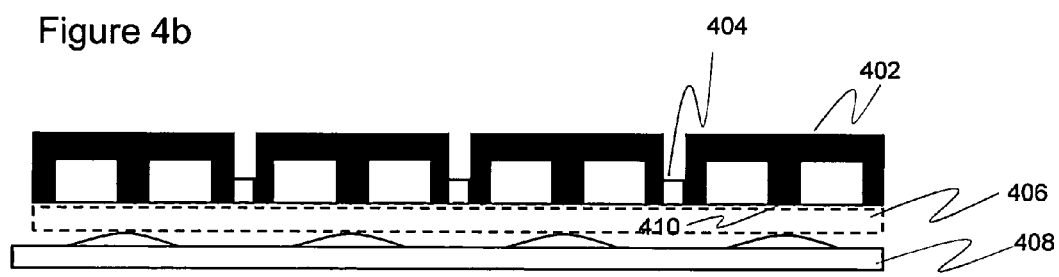

FIG. 4c illustrates a further embodiment of a keypad assembly in accordance with the present invention. The keys 402 include a rigid, flat actuation member, such as a plunger 404, whereas the surrounding hollow space within a key structure according to this embodiment is filled with gas such as air. A flexible member 404 may be provided between the adjacent keys 402.

Figure 4D:
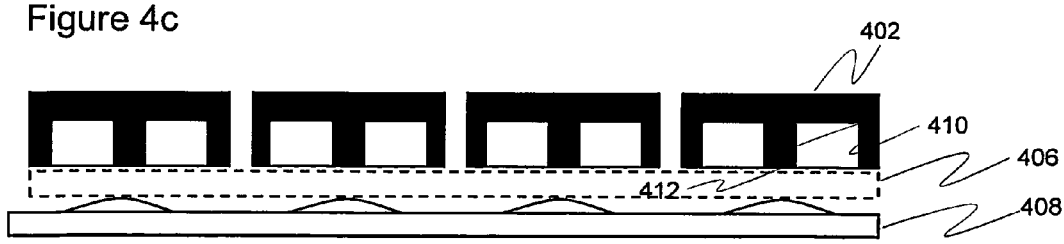

FIG. 4d illustrates a further embodiment of the keypad assembly in accordance with the present invention. The keys 402 with rigid actuation members 410 may be disposed directly on the lightguide 408 top e.g. by an adhesive strip 412.

The dome sheet 408 in the above-described and other embodiments may overlay or be integrated with an electric circuit board or other electrical arrangement including a number of conductive contact elements, each possibly forming at least part of an electrical switch that may be actuated (opened or closed, for example) as a result of a predetermined amount of deform of the corresponding dome. A dome may include one or more electrically conductive members or electrically conductive areas for cooperating with the conductive element(s) of the underlying circuit board or other electrical arrangement for implementing such switches or some other type of electrical circuits. The event that deforming a dome may cause, such as closing a switch by making an electrical contact, may trigger performing a corresponding action in the host device, such as a mobile terminal. The event may also or alternatively be optic in nature. The action may include inserting a character on a display or executing other function(s) as controlled by processing means of the device, for example. Alternatively or additionally, the action may be performed when the key is released and original dome shape returned.

Figure 4E:
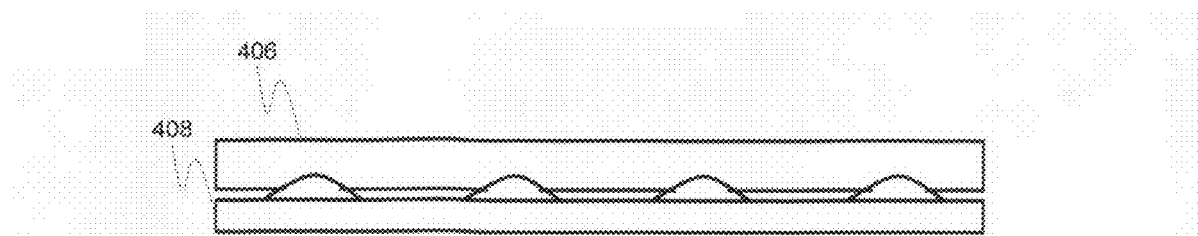

In the embodiment shown in FIG. 4e the dome sheet 408 is integrated with a lightguide bottom 406. The dome sheet 408 may be directly laminated on the lightguide 406, for example, including an electrical circuit. The electrical circuit may be manufactured on the lightguide surface or on a lightguide reflector surface, e.g. with a printing method.

Figure 4F:
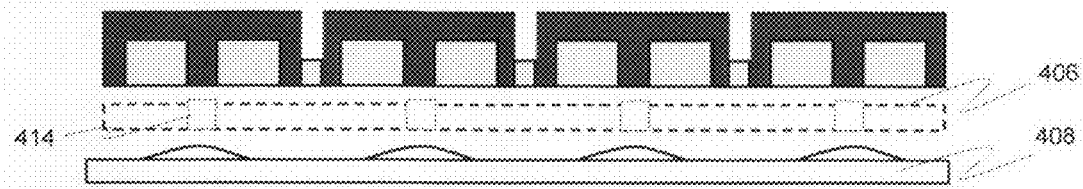

FIG. 4f illustrates an embodiment wherein at least part of a rigid actuation member forms a portion 414 of the lightguide. The at least part of a rigid actuation member may be selected as optically continuous with the surrounding lightguide material so that the light propagating in the lightguide is not substantially affected by the boundaries between the rest of the lightguide and the portion of harder material. This aspect of embodiment of FIG. 4f may be adapted to previous embodiments as well. The elements of FIG. 4f have been vertically separated for illustrative purposes only.

The dome sheet of the keypad assembly embodiments in accordance with the present invention may be adapted/integrated on the lightguide element in order to decrease the amount of components required in a keyboard or keypad. Along these lines, electrical contacts and/or circuitries may be provided on one or more lightguide layers making up a lightguide element. These contacts and circuitries may be provided utilizing the latest lamination and printing processes. For example, a roll-to-roll process may be utilized. In addition, optic surface relief structures may adapted/integrated on a keypad or keyboard component, or it can be laminated on the top of a printed circuit board. The buttons and keys may be diffusing collimated light for larger illumination angle.

Figure 5:
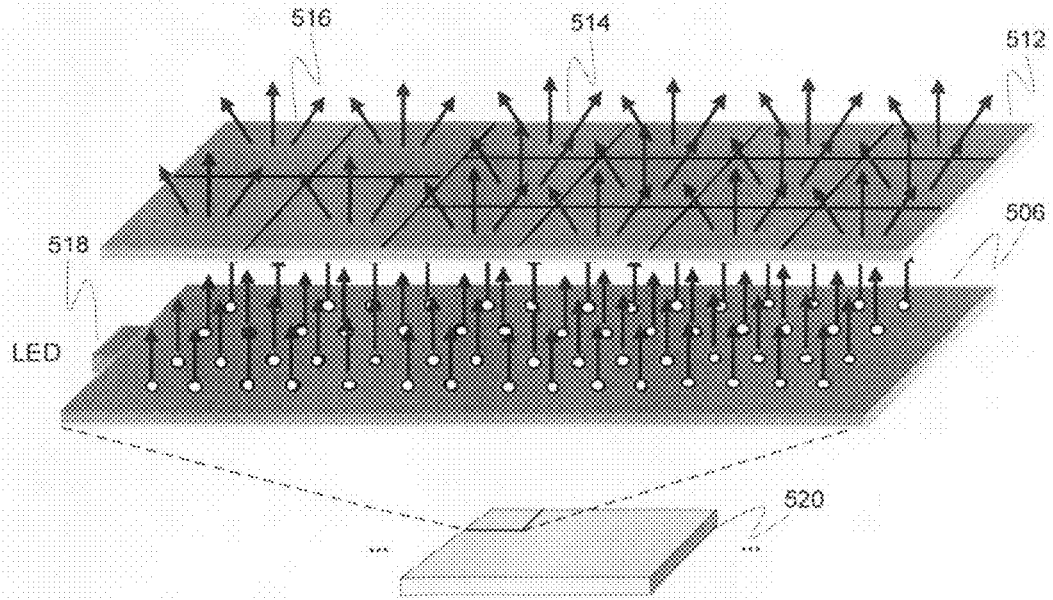
FIG. 5 illustrates one embodiment of a multi-purpose lightguide together with an application-specific diffuser element.

In FIG. 5 a further embodiment of an integrated lightguide arrangement in accordance with the present invention is presented. A multi-purpose lightguide sheet 520 may be manufactured and cut to an application-specific size 506. Although merely rectangular forms 520, 506 have been presented in FIG. 5, the sheet 520 and/or the cut element 506 may have other form, e.g. elliptical, round, or triangle form, depending on each particular application. The resulting lightguide element 506 may include a collimating/directive micro-optic surface relief structure, such as a dot matrix of e.g. blazed grating units/pixels (small circles in the FIG. 5), for example. Additionally or alternatively, other micro-optic forms may be applied. The micro-optic structures may also be optically modulated over the surface area. The desired, application-specific illumination effect may then be obtained by disposing an application-specific optical element 512 on top of the multi-purpose lightguide element 506. The element 512 may include optical function such as a light diffusing function in order to achieve uniform illumination. The element 512 may be implemented as a key mat or at least part thereof, for example. The element 512 may further form a part of a keypad assembly as reviewed hereinbefore. The element 512 may include a plurality of at least functionally separable portions 514, 516 configured to (out)couple light in a plurality of predetermined ways.

Figure 6A:
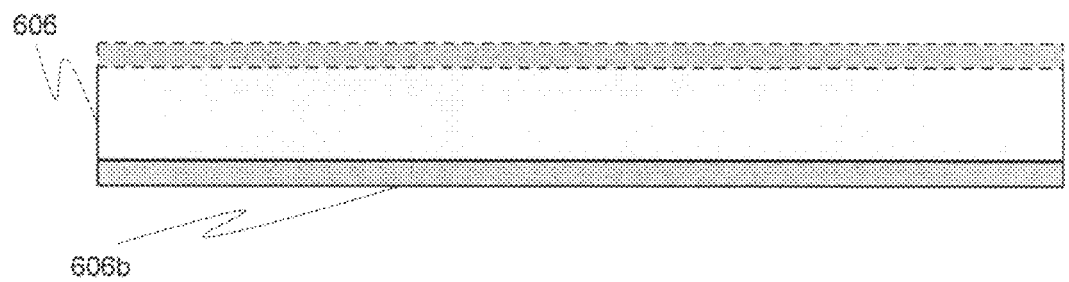
FIG. 6a illustrates one embodiment of lightguide material characteristics cultivated for roll-to-roll embossing.

FIG. 6a illustrates an embodiment of a lightguide bulk material 606 that may be tailored for roll-to-roll embossing of micro-optic structures thereto. Namely, a primary bulk material 606, such as a flexible and optically substantially transparent layer, may be provided with an additional (bottom) layer 606b that may be stiffer and more rigid than the softer and more flexible (top) primary material layer 606. The additional layer 606b including e.g. PMMA, PC, PET, or harder TPU is typically thinner than the softer primary layer 606, the latter of which including e.g. elastomers, such as TPU (thermoplastic urethane). The additional layer 606b may include functional elements such as micro-optic structures or a reflector, for example. The additional layer 606b may be positioned on one side of the layer 606 so that it is to be replicated with micro-optic surface relief pattern during the roll-to-roll embossing, or on the opposite side. Alternatively, both sides of the layer 606 may be provided with either similar or different additional layers 606b, a second additional layer being represented via a broken line in the FIG. 6a. The additional layer 606b may further have a predetermined color and/or refractive index, which may optionally differ from the ones of the primary layer 606. The co-extruded additional layer 606b typically stabilizes the replication phase during the roll-to-roll embossing so that the elongation of the lightguide may be avoided or at least reduced, and the output speed of the lightguide is kept more constant and closer to the input speed relative to the applied rollers. The layers 606, 606b may be laminated.

Figure 1:
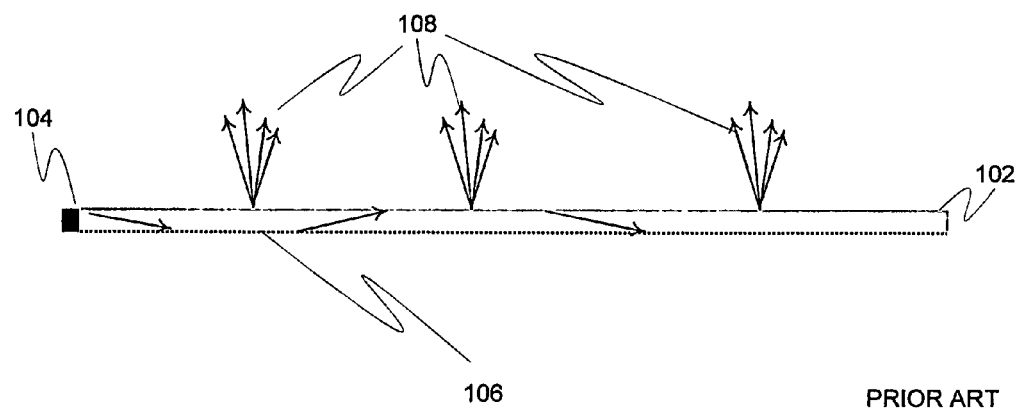
Figure 2:
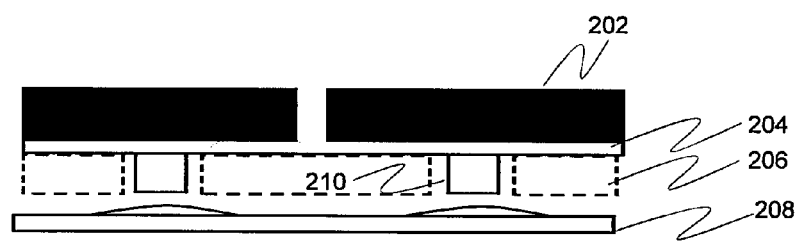
Figure 3:
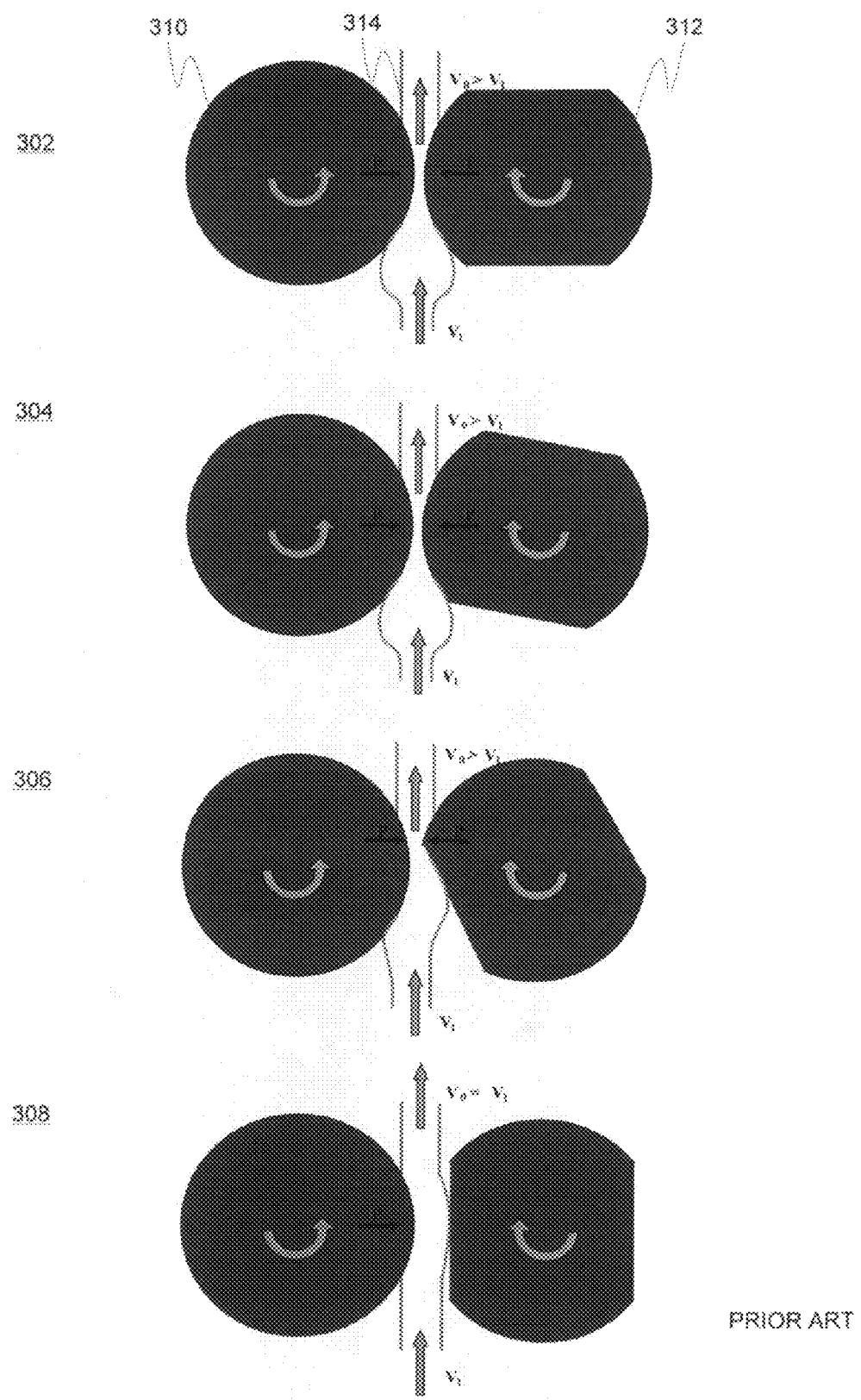
Figure 6B:
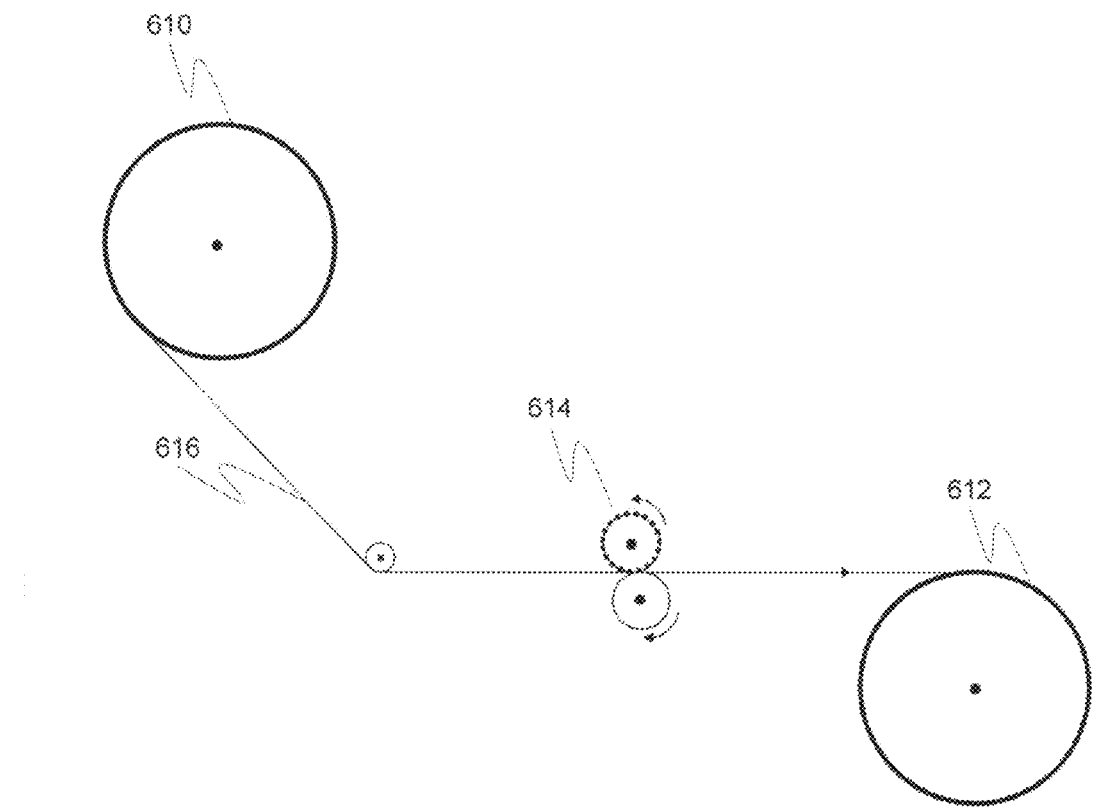
FIG. 6b illustrates one embodiment of roll-to-roll embossing.

In an embodiment of a process for (ultra) thin lightguide manufacturing utilizing a continuous roll (roll-to-roll) replication, see FIG. 6b, bulk material 616 may move from roll 610 to roll 612. Using this fast, cost-effective manufacturing method, the bulk material 616 can be replicated with a surface relief replicator 614, such as a nickel coated cylinder, drum, or roll having an optical surface relief structure. As in FIG. 3, the replicator 614 may include portions that introduce clearly varying pressure to the material 616 (due to e.g. missing segments of a roller), or the pressure may be kept more constant. In the embodiment shown in FIG. 6b one or two additional layers 606b may have already been integrated with the layer 606 to form the bulk material 616 prior to triggering the process execution.

Figure 6C:
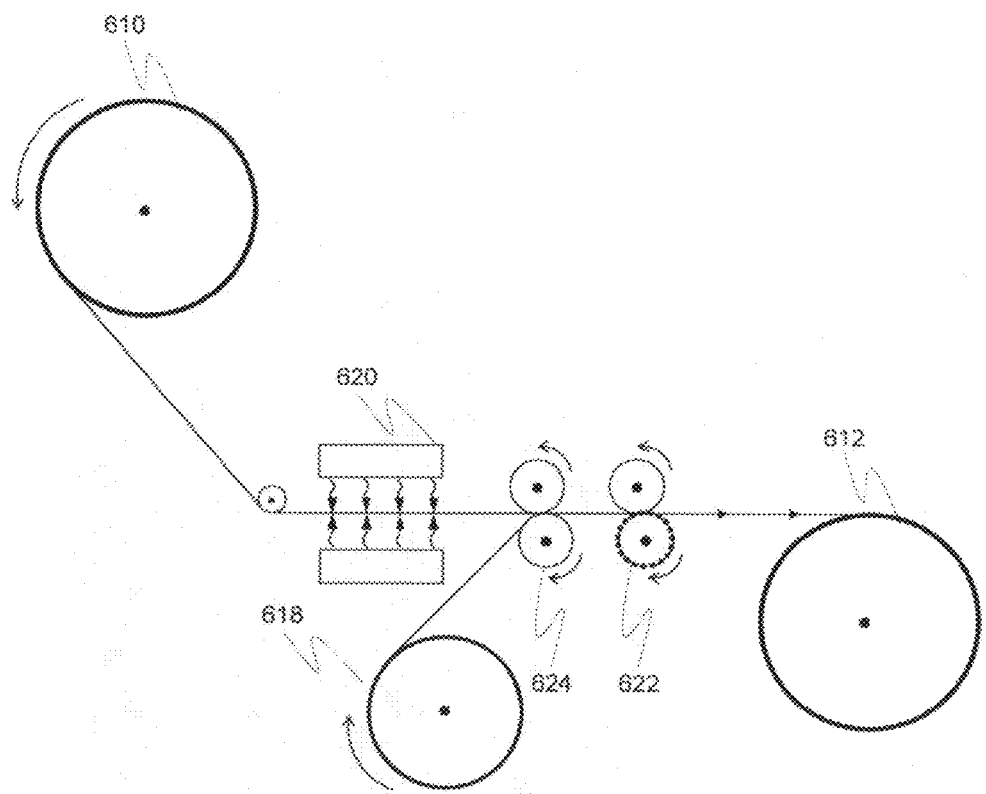
FIG. 6c illustrates one another embodiment of roll-to-roll embossing.

FIG. 6c illustrates another embodiment of a process for (ultra) thin lightguide manufacturing by means of continuous roll replication. The material 606 may be configured to move from roll 610 to roll 612. The additional layer 606b may be laminated onto the surface of the material 606 from the roll 618 during the production method. The following pair of rollers 622 may be configured to emboss the desired surface relief pattern on the aggregate material of 606, 606b on either side thereof (in the illustrated scenario of FIG. 6c the actual embossing roller is the lower one). Alternatively, rollers 624 may provide the layer 606b with the surface relief pattern substantially simultaneously with the laminating process. An extra pre-heating 620 may be utilized in order to achieve better lamination quality.

The roll-to-roll embodiments of the present invention typically offer fast production rates with high optical product quality.

Other suitable methods for producing micro-optic surface relief forms may include continuous or discrete casting methods (UV or thermal curing), compression molding, continuous or discrete embossing, such as hard embossing, soft embossing and UV embossing, among others. Melt film can also be used. Although many manufacturing processes may be utilized, some may be particularly suitable to manufacturing particular embodiments. For example, blazed type structural profiles may be best manufactured by means of roll-to-roll UV-embossing or a melt film method, in order to achieve accurate and high quality replication. Different kinds of figures and masks can be printed or laminated on the lightguide layer, optionally including electrical contact and circuitries. This may in some cases be a crucial cost issue.

After the surface relief structures are formed, the lightguide layers can be cut to desired shapes directly from a roll or film by means of laser, die cutting and/or other means. Also, optical features can be manufactured during the cutting process. Such optical features particularly include narrow boundary lines, which can be reflecting or directing light for a particular area(s), or directing/diffusing light in the first part of lightguide. This cutting process can be completed in the roll-to-roll process with very short unit times and costs. The obtained lightguide may be the multi-purpose lightguide as presented hereinbefore.

A person skilled in the art will appreciate the fact that the above production methods may also be cultivated and modified application-wise as required.

Figure 7A:
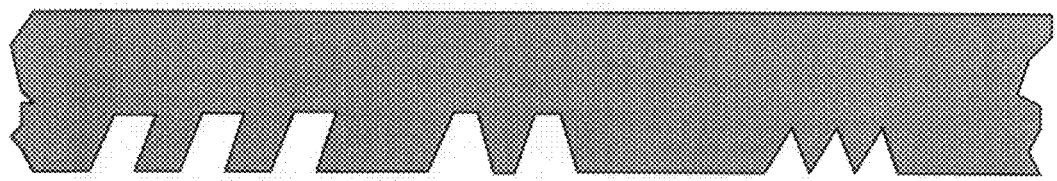
FIG. 7a represents illustrations showing cross-sectional views of various embodiments of basic structural features of surface relief structures on a lightguide.
Figure 7B:
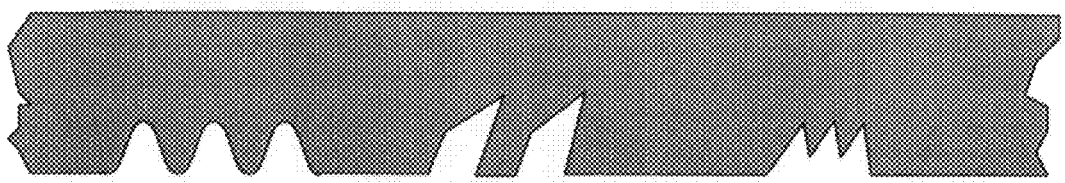
FIG. 7b represents further illustrations showing cross-sectional views of various embodiments of basic structural features of surface relief structures on a lightguide.

FIGS. 7a and 7b represent illustrations showing cross-sectional views of various embodiments of basic structural features of micro-optic surface relief structures. These shapes (slanted, sinusoidal, triangular, etc) represent only a few examples of the cross-sectional shapes that the basic structural elements may have. Any lightguide according to an embodiment of the present invention may include one or more of these shapes in any region of surface relief structures. To facilitate the understanding of these features, the features are illustrated in a few discrete groups. As is apparent from the discussion herein, the surface relief structures may be provided, in practical circumstances, anywhere on a lightguide layer.

A lightguide may generally include more than one lightguide layer. If the lighting element includes more than one lightguide layer, the lightguide layers may have the same cross-sectional area. Alternatively, the lightguide layers may have different cross-sectional areas. The number of lightguide layers may vary over the lightguide element. The thickness of the single lightguide layer may be about 0.01 mm to about 0.4 mm. The lightguide element may have a thickness similar to the height of the light source.

The entire lightguide element may be planar. At least a portion of one or more of the lightguide elements is typically flexible and/or bendable. One or more bends formed in one or more portions of one or more lightguide elements of may be permanent or the lightguide element may be bent during use, i.e. upon introducing a force thereto. The lightguide may be flexible in the sense that light can still be propagated through it and outcoupled out of it on either side of curve or bend. If the lightguide element includes more than one lightguide layer, one or more the lightguide layers may be bendable and/or flexible. When at least a portion of the lightguide element is curved, the angle of the curve typically does not exceed a total reflection angle.

If the lightguide element includes more than one lightguide layer, one or more films may be arranged at least a portion of any region between overlying two lightguide layers. A variety of different films may be arranged between lightguide layers. For example, the film can include one or more of reflector films, diffuser films, prismatic films and brightness enhancement films, in order to form different lighting performances.

Typically, at least one light source produces light that is introduced into the lightguide element. The light source could include at least one LED or other suitable light source. The light is incoupled into the lightguide element. The light source(s) could be connected directly to the lightguide element and directly introduce light into the lightguide element(s). Alternatively, the lighting element(s) may be arranged with one or more incoupling structures. The incoupling structure(s) may include a wedge including specular reflectors on at least one of a top and bottom surface, an elliptical light pipe, a focusing lens and/or a bundle of split optic fibers. The light source(s) and the incoupling structure(s) may be a unitary structure(s). Where one or more the lightguide elements include multiple lightguide layers, the incoupling may vary among the layers. Some embodiments of the incoupling structure may include a slanted, a blazed or a radial binary grating structure with or without diverging lens.

The present invention may provide great advantages over known lightguide structures, particularly in terms of providing a thin and flexible structure. For example, an ultra thin lightguide requires less space. This can be a very important issue especially in hand held products, such as mobile terminals, wrist computers, PDAs, watches, but also in other display, keypad, console and lighting solutions.

Embodiments of a thin, flexible lightguide according to the present invention wherein the lightguide can be bent, may allow producing interesting applications, such as flexible and/or curved displays, flexible phones, clam shell mobile terminals ("flipphones") as to be reviewed hereinafter. Embodiments of the present invention that include multiple lightguide layers offer the ability to easily control light incoupling/outcoupling and other optical performances, in each layer, for example. Two or more lightguide layers can be stacked on top of another. Reflector and/or films can be utilized between these.

Light may be incoupled into the lightguide layers in proportion to layer thickness. Along these lines, thickness typically incouples less light, whereas more thickness typically incouples more light. This can provide a very easy way to control the light incoupling and can also distribute the light to different lightguide layers. This concept is suitable for dual backlights, backlights with keypad lighting, dual backlights with keypad lighting, among other structures.

The total thickness of the lightguide can be the same as the height of the LED(s). For example, according to one embodiment, the LED(s) has a height of about 0.8 mm.

The present invention may include a centralized light source arrangement. This typically requires less light sources (e.g. LEDs), less assembly costs and less space. Embodiments of the present invention that include multi-layer lightguide layers can utilize light sources that are placed on only one edge of the lightguide stack up. All lightguide layers may propagate light to the right area, in order to be illuminated.

Embodiments of the present invention can provide practical variability in the size of the lightguide and the amount of light sources. This can provide more flexibility to utilize the same lightguide design in different applications. The lightguide design may be formed for a specific size with a specific optical diffusing structure or light directing structure in the first (light incoupling) part, which is in the vicinity of the light source(s), which is not dependent on precise light source (e.g. LED) placement. This type of optical design can allow the use of different amounts of light sources, while having the minimum quantity of light sources and maximum quantity of light sources on the same edge. This can permit achieving higher or lower brightness with the same uniformity performance. Additionally, the same lightguide design can be cut to different sizes in order to achieve the same performance in uniformity.

Some embodiments of the present invention can provide an ultra thin lightguide (filmlike) solution with a single layer thickness of about 0.4—about 0.01 mm. Embodiments of the present invention can include lightguides with single layer and multilayer solutions. All layers may have surface relief structures, which may be formed on the surface in order to achieve different optical functions. These optical structures can be diffractive and/or refractive having different profiles such as binary, slanted, blazed, and sinusoidal, etc., forming different light outcoupling groups or sub-groups.

Multilayer lightguide elements according to certain embodiments of the present invention may have a thickness that may be matched by the height of the light source. For example, if the light source includes an LED, the LED may have a height of about 0.8 mm, the lightguide element may include multiple lightguide layers and a reflector arranged between the layers may have a height of about 0.8 mm. The light incoupling and luminance (brightness) may be controlled by varying the thickness of a lightguide layer. For example, light from the light source may incoupled into the lightguide layers in proportion to layer thickness. Along these lines, less thickness=less light incoupling and less brightness, more thickness=more light incoupling and more brightness. This is a very simple way to control the light incoupling and distributes the light to the different lightguide layers, permitting a controlled and desired brightness to be realized in each of the lightguide layers.

The optical structure, or surface relief structure, of a thin lightguide typically requires a high and increased degree of modulation to achieve the uniform light outcoupling distribution, or brightness. The optical basic structure typically must be very fine, such as on the order of smaller than about 10 microns or less in height, and on the order of about 10 microns or less in one lateral dimension, in order to achieve the desired degree of modulation. This makes it possible to form small discrete outcoupling structure groups and control the proportion of outcoupling structures on the lightguide layer more accurately. Typically, in thin lightguide layers, the optical structures are arranged in small discrete outcoupling structure groups, wherein a region of the lightguide layer in the vicinity of the at least one light source the outcoupling structure groups include about 10% or less of the area of the lightguide layer. In this region a maximum distance between small discrete outcoupling structure groups may be about 300 microns or less. This region may be the most crucial part of the lightguide structural design, because an intensity of incoupled light can be about 50% or more of maximum intensity. Conventional microstructure solutions that are based on bigger and higher optical details typically have difficulties in thin lightguides in order to achieve uniform brightness.

Embodiments of a lightguide element according to the present invention may be flexible. In some embodiments, less than all portions or layers of a lightguide element may be flexible. Embodiments of the invention including a flexible lightguide element can be permanently or temporarily bent into a desired form. Such embodiments can be flexible and curved (bent) for desired form, yet to substantially fulfill total reflection theory and not exceeding the total reflection angle.

A thin lightguide may help to prevent light leakage, because light beams typically hit the optical structure more times than in a thicker lightguide. The total light can be outcoupled more efficiently, causing less light leakage at the end of the lightguide.

Ultra thin lightguides can be used as a single layer with or without other optic films (reflector, diffusers, brightness enhancement films). Thin lightguide layer can have fine optical structures, either on one side or both sides of the layer.

In order to use only one lightguide layer, a conventional LED may be adapted to the lightguide layer with a specific optical component or adapter, which may help to incouple light into a thin lightguide layer. For example, the height of the LED(s) may be about 0.8 mm as compared to a lightguide layer having a thickness of about 0.2 mm. This LED optical component or adapter could be, for example, a wedge-type solution with specular reflectors on the top and bottom. Other incoupling structures that may be utilized can include a thin elliptical light pipe, a focusing lens or a bundle of split optic fibers. Also, LEDs with circuitry can be in-molded into this adapter. This can make it easier to handle them. This adapter can contain snap structures in order to connect it to the lightguide layer easily. This adapter can be made of either rigid or flexible optical material. Process methods for forming the adapter can be, for example, casting or injection molding. Light incoupling may be completed with specific grating structures on the bottom or on the top surface. For example, a slanted, a blazed or radial binary grating structure may be utilized with or without a diverging lens.

Ultra thin lightguide elements can be constructed with two or more layers. Lightguide layers can form, for example, a dual backlight solution, backlight and keypad lighting solution, dual backlight and keypad lighting solution. For dual backlight solution, only one reflector film between lightguide layers may be required. This can cut costs and make a package thinner and easier to handle and assemble. In a solution that includes two layers, the optical outcoupling structures can be arranged in the center line of the lightguide solution (inner surfaces of lightguide layers), because the major part of incoupled light may be propagated along a center line. In the words, the majority of light may be propagated at high incidence angles.

One or more lightsources may be arranged to provide light that is introduced into the lightguide element. According to some embodiments, all light sources can be placed on the one edge of a lightguide element for light incoupling into the lightguide layers. This centralized light source arrangement may reduce the amount of needed light sources and remove the need for a light source multi-assembly. This can have a direct influence on total cost reductions.

One application is the backlight and keypad combination, where a centralized LED arrangement can be used on the edge of lightguide stack up. The same LEDs can provide illumination for the backlight and keypad. In conventional solutions separate LEDs for both the backlight and keypad illumination must be used.

Figure 8:
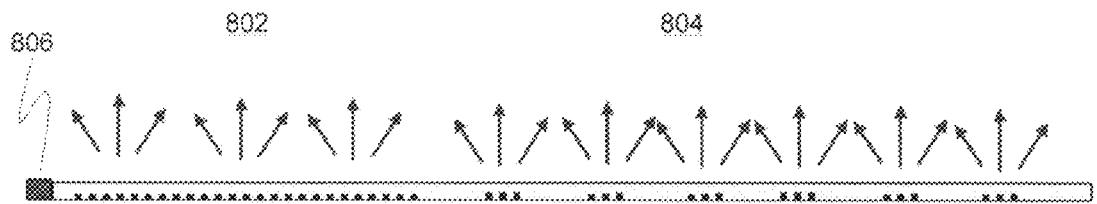
FIG. 8 illustrates an embodiment of a flexible lightguide for both keypad and display illumination.

FIG. 8 discloses one embodiment of a lightguide including one or more layers. The lightguide according to this embodiment is configured for display and keypad illumination via parts 802 and 804, respectively. Lightguide is typically substantially continuous, i.e. without major apertures and flexible for providing improved tactile feeling over prior art solutions. One or more light sources 806 such as LEDs may be used with this solution, and the illumination of both the display and keypad may be simultaneously achieved.

The optical structure of the lightguide layer can be designed with variation capabilities concerning its size and the number of light sources that it incorporates. The optical lightguide design in a certain part (light incoupling part) of the lightguide structure can be optimized in such a manner that the light from a point source, such as an LED, may be diffused at different conical angles or directed partially at the same angle, in order to achieve more uniform and/or directed light distribution in the first part. The optical design of the lightguide is not dependent on an exact light source placement. This type of optical design allows the use of different numbers of light sources, having a minimum quantity of light sources and a maximum quantity of light sources on the same edge in order to achieve higher and lower brightness with same uniformity performance. This type of optic surface relief structure may be placed on the top and the bottom surface of the first part of lightguide layer, having diffractive or refractive grooves.

Partially reverting to the embodiment of FIG. 5, the outcoupling structure may be optimized in such a manner that it allows cutting and using the same lightguide basic design in different sizes in order achieve the same uniformity performance. This can make a lightguide solution more variable and flexible regarding a number of different solutions and applications, without the need to design many lightguide elements, which may have only slight differences in brightness and size requirements.

An (ultra) thin lightguide layer according to an embodiment of the present invention can be used in keypad lighting, having a thickness of about 50 to about 200 microns, which provides a good flexible and touch sensitive performance, while retaining a click effect, i.e. good tactile feeling. As a result, the lightguide layer can be used without any apertures for the keys and buttons. This makes light management easy in order to achieve uniform keypad lighting. Also, less LED components may be needed, because the light can be outcoupled more efficiently. This lightguide layer according to this embodiment can be placed between buttons and dome sheet and it requires much less space than a conventional lightguide.

Figure 9A:
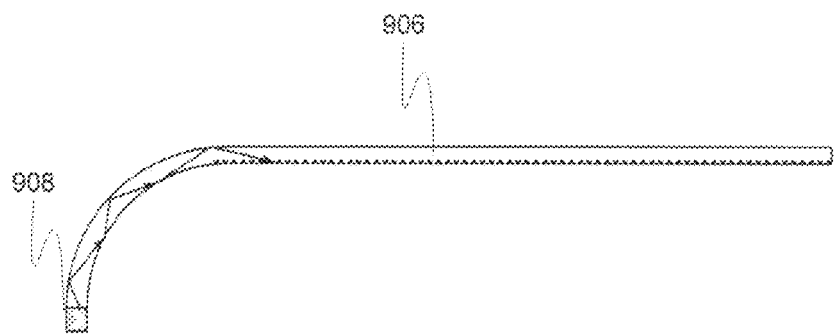
FIG. 9a illustrates an embodiment of a curved lightguide.

FIG. 9a illustrates an embodiment of a curved ultra thin lightguide element 906 that includes an optical surface relief structure (serrated pattern in the figure, light rays being visualized as arrows) on at least one side of the surface for light outcoupling. This embodiment of an (ultra) thin lightguide can be flexible and curved into a desired form in order to substantially still fulfill the total reflection theory. This ultra thin lightguide solution can utilize top view LEDs 908.

Figure 9B:
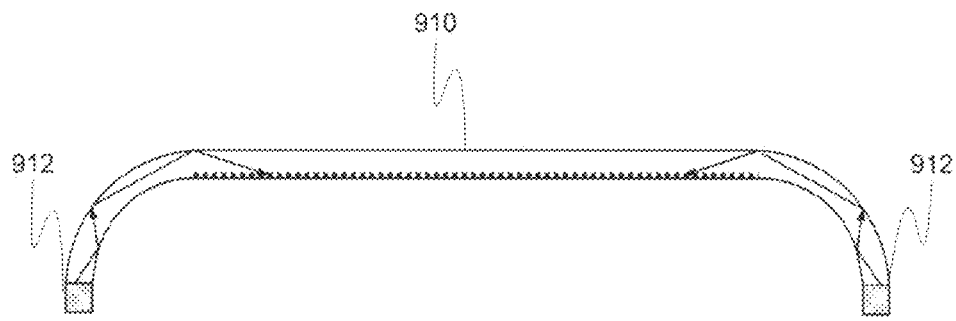
FIG. 9b illustrates another embodiment of a curved lightguide.

FIG. 9b illustrates an embodiment of a double curved ultra thin lightguide element 910 with an optical surface relief structure on at least one side of the surface for light outcoupling. This ultra thin lightguide can be flexible and curved into a desired form in order to fulfill total reflection theory, and does not exceed the total reflection angle. This ultra thin lightguide solution may include e.g. two light incoupling surfaces utilizing top view LEDs 912.

Figure 10A:
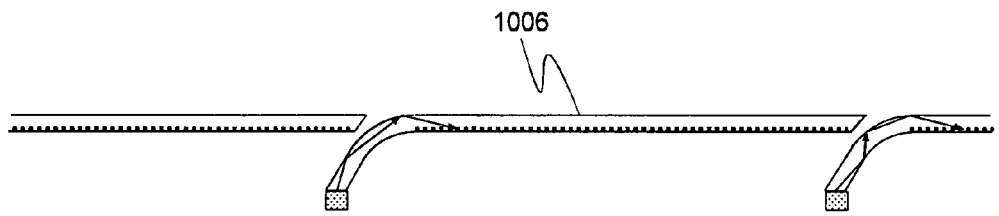
FIG. 10 illustrates an embodiment of a lightguide matrix.
FIG. 10b illustrates an embodiment of a bendable lightguide.
FIG. 10c illustrates an embodiment of a multi-layer lightguide.
FIG. 10d illustrates another embodiment of a multi-layer lightguide.

FIG. 10a illustrates an embodiment of an ultra thin flexible lightguide element 1006 configured to form a part of an illumination matrix. This matrix may include several lightguide modules in order to form larger illuminated active area in at least one direction. This application may further be suitable backlight solution for a flat display, such as an LCD TV. This solution may include top view LEDs as a light source. Of course, other light sources could be utilized and/or alternatively arranged, as may the lightguide elements be alternatively arranged.

Figure 10B:
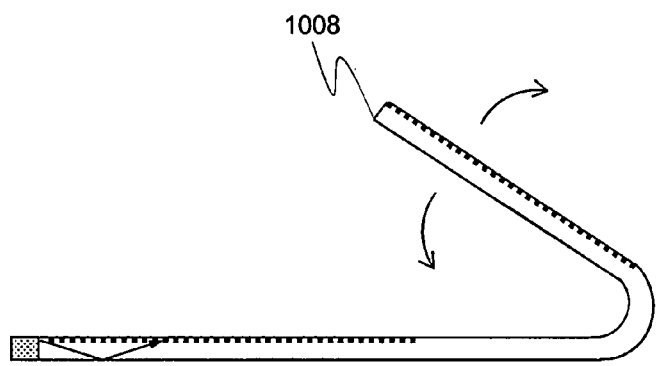

FIG. 10b illustrates an embodiment of a flexible ultra thin lightguide element 1008 according to the present invention having two separate optical surface relief structures on at least two different surfaces of the lightguide for light outcoupling. This thin lightguide is flexible and can be bent into a desired form. Typically, the bending is carried out in order to fulfill total reflection theory and does not exceed the total reflection angle. This embodiment of an ultra thin lightguide solution can utilize, for example, in top view LEDs.

Figure 10C:
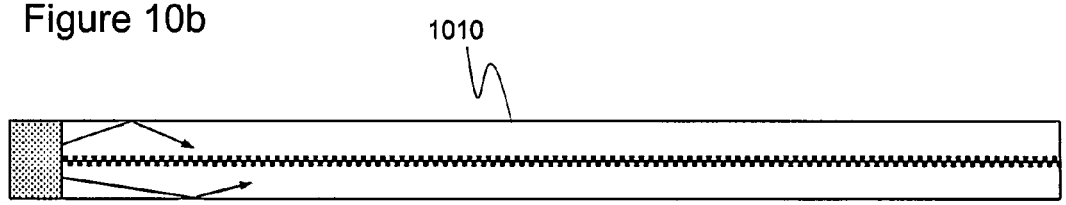

FIG. 10c illustrates an embodiment of a multi-layer lightguide element stack 1010 that is based on two lightguide layers with an optical surface relief structure on one side of both layers (on the whole surface for the light outcoupling). This lightguide solution may have substantially even thickness typically about 0.4 to about 0.8 mm with the LED at the same height.

Figure 10D:
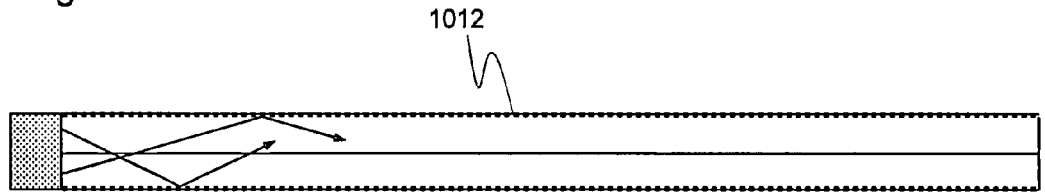

FIG. 10d illustrates another embodiment of a multi-layer lightguide element stack 1012 that includes two lightguide layers with an optical surface relief structure on one side (side facing towards the other layer) of both layers on the whole surface for the light outcoupling. This lightguide solution may have a substantially even thickness typically about 0.4 to about 0.8 mm with the LED at the same height.

Also configurations based on two lightguide layers with an optical surface relief structure on both sides of both layers optionally on the whole surface for the light outcoupling are possible. Optionally, a functional element such as a reflector film may be placed between the lightguide layers.

Figure 11A:
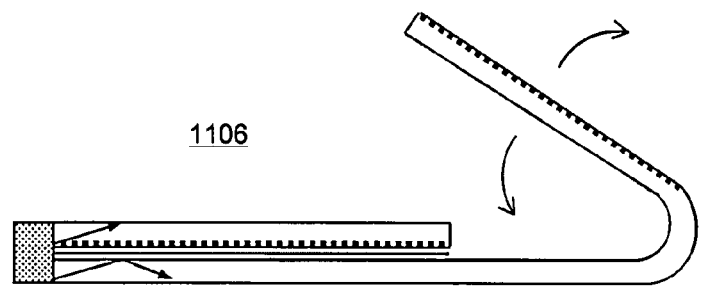
FIG. 11a illustrates an embodiment of a bendable multi-layer lightguide.

FIG. 11a illustrates an embodiment that includes a flexible multi-layer dual lightguide element stack 1106 that has two lightguide layers with optical surface relief structures on at least a portion of a side of both layers for the light outcoupling. Between the lightguide layers may be arranged a reflector film. This lightguide solution is flexible and can be bent into a desired form in order to fulfill total reflection theory. The light incoupling and brightness may be controlled by varying the thickness of the lightguide layer, wherein more thickness typically equals more light and less thickness typically equals less light. This lightguide solution may be suitable for dual display backlighting, such as in a clam shell mobile terminal, or flip phone, and may have a substantially uniform thickness, typically about 0.4 to about 0.8 mm with the LED of about the same height.

Figure 11B:
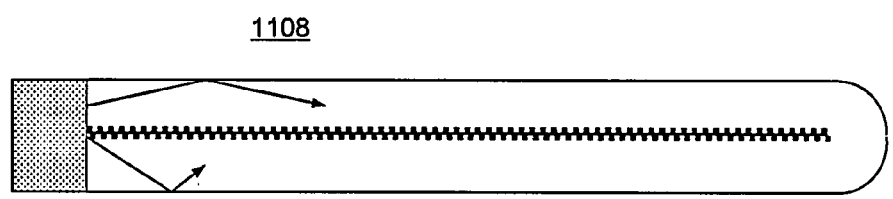
FIG. 11b illustrates an embodiment of a folded lightguide.

FIG. 11b illustrates an embodiment that includes a multilayer lightguide element stack 1108 that is based on one lightguide layer including optical surface relief structures on one side of layer for the light outcoupling. The lightguide layer may be folded up in order to form complete lightguide stack up. As can be seen from the figure, the surface that includes the surface relief structures may then contact itself. This illustrates how the present invention can provide a multilayer lightguide element with only one lightguide layer. This lightguide solution can prevent light leakage in the end of lightguide. The thickness is typically about 0.2 to about 0.8 mm with the LED at the same height. In a further embodiment, a functional element, such as a reflector, may be provided between the lightguide layers.

Figure 11C:
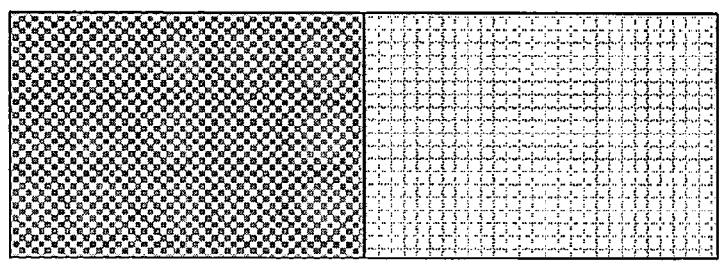
FIG. 11c illustrates a further embodiment of a lightguide.

FIG. 11c illustrates an embodiment of an ultra thin lightguide with different optical surface relief structures on at least one side of the whole surface in order to achieve different light performances such as light directing or collimating, diverging, polarizing, among others. The lightguide layer may be folded up in order to form complete lightguide stack up. This solution provides more performances in one package.

Figure 11D:
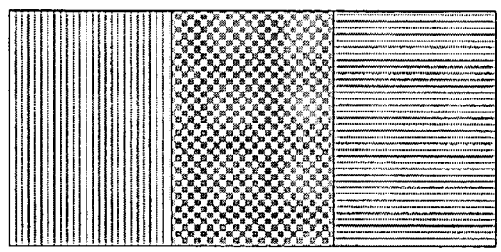
FIG. 11d illustrates still a further embodiment of a lightguide.

FIG. 11d illustrates an embodiment of an ultra thin lightguide element having different optical surface relief structures on at least one side of the whole surface in order to achieve different light performances, such as light directing or collimating, diverging, polarizing, among others. The lightguide layer may be folded up in order to form complete lightguide stack up. This solution can provide more performances in one package.

Figure 12A:
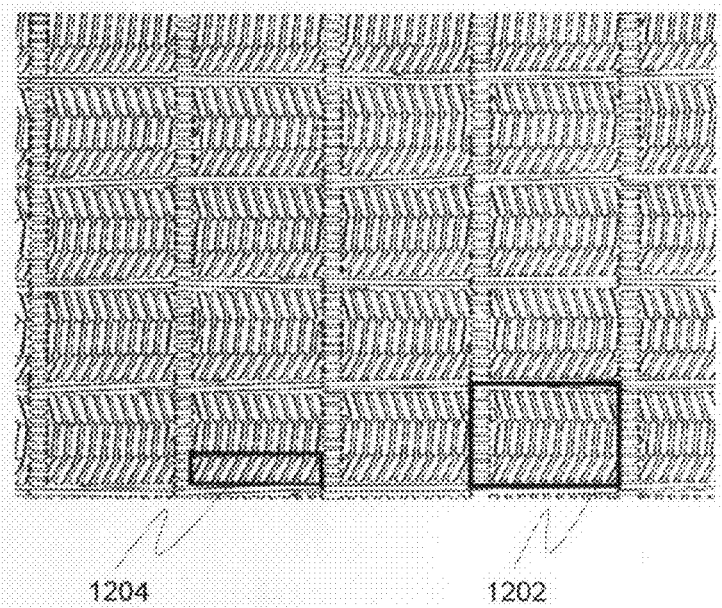
FIG. 12a illustrates an embodiment of lightguide surface relief structures.

FIG. 12a illustrates an embodiment of a lightguide structure that may be utilized in regions of the lightguide element remote from light source(s), for example. As shown by this exemplary embodiment, the surface relief may include basic structural features, such as grooves and/or recesses arranged in different groups having different sizes, shapes, orientations, configurations. The characteristics of the surface relief may also vary. Along these lines, the filling factor, shape, size, profile, cross-section, and/or orientation, may vary among other characteristics. The groups may or may not be arranged in repeating patterns. Each group may practically have any desired shape, such as a shape of a regular or irregular polygon. For example, the groups could be rectangular, triangular, square, trapezoidal or any other shape. The arrangement of the grooves and/or recesses may vary within each sub-group, within each group, and/or over the entire structure. The characteristics of the grooves and their arrangement may vary be varied to vary the incoupling and/or outcoupling characteristics of the structure. For example, the arrangement could maximize the diffraction efficiency. The arrangement could also make diffraction efficiency is a function of location. In the embodiment shown, the surface relief structure is arranged in groups 1202. Each group includes a plurality of sub-groups 1204 that each includes basic structural features on the order of about 10 microns or less in height, and on the order of about 10 microns or less in each lateral dimension, for example. Each group and subgroup could have other configurations.

Figure 12B:
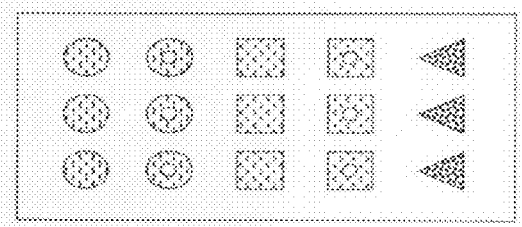
FIG. 12b illustrates an embodiment of lightguide surface relief structures with discrete shapes.

FIG. 12b illustrates an embodiment of a lightguide layer that may be utilized for keypad lighting, for example, with the discrete fine optic surface relief structures forming uniform and discrete illuminating areas. Such areas may also form symbols or other shapes that can be illuminated in order to indicate e.g. desired status information of the host device via the lightguide.

Figure 12C:
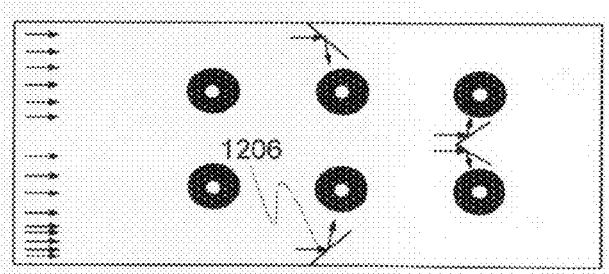
FIG. 12c illustrates an embodiment of lightguide surface relief forms with optional boundary surface lines.

FIG. 12c illustrates an embodiment of a lightguide layer for keypad lighting, for example, with the fine optic surface relief structures, and optional short boundary surface lines 1206 produced by cutting process, which can be reflecting or directing light for the illuminating areas.

Figure 12D:
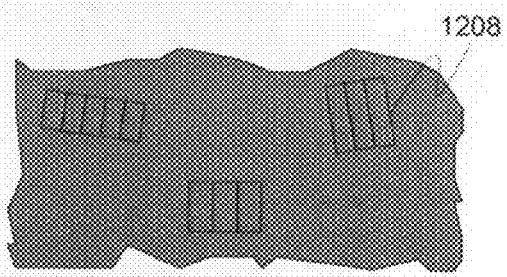
FIG. 12d illustrates an embodiment of a lightguide including a plurality of micro-optic outcoupling structure groups.

FIG. 12d illustrates a portion of an embodiment concerning a typically thin lightguide layer wherein the different basic structural features of surface relief structures are forming small discrete outcoupling structure groups 1208, wherein the number, arrangement and/or size of each surface relief structure and/or height and/or lateral dimensions of the structural features of the surface relief structures being varied to provide a desired degree of outcoupling modulation of light incoupled into the light guide element.

The above embodiments of various lightguide configurations may be applied in the following functional, indicative and/or decorative applications, for example.

Figure 13A:
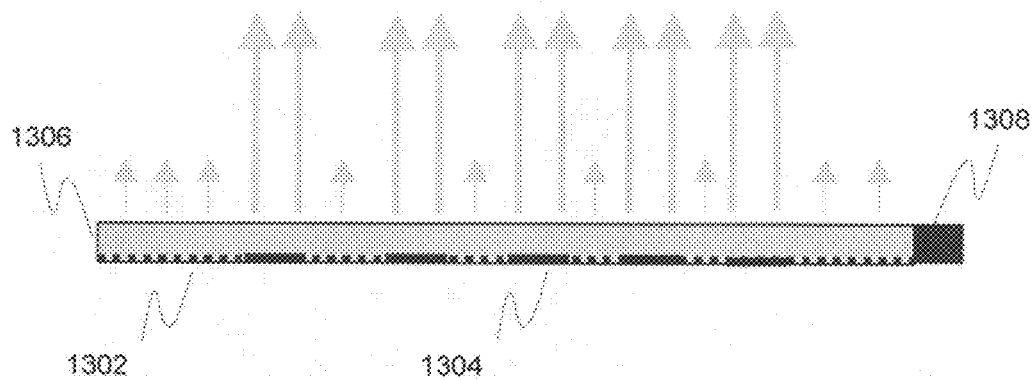
FIG. 13a illustrates an embodiment of the present invention in which a lightguide is provided with two or more illumination levels for indicative and/or decorative effects.
Figure 13B:
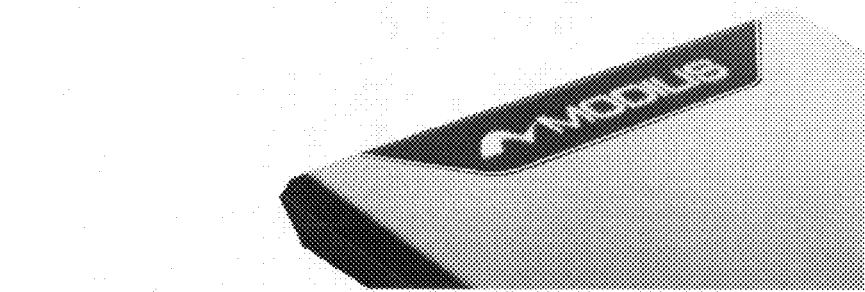

In an embodiment of FIGS. 13a and 13b a lightguide 1306 with two or more illumination levels for indicative or decorative effects, such as logos, words, figures, are presented. A light source, such as an LED, is illustrated by 1308. Different illumination levels may be designed with micro optical surface relief structures 1302, 1304, e.g. blazed and binary gratings. Background illumination of lightguide having lower or higher luminance, substantially different illumination level (notice a brighter "Modilis" text surrounded by an area with a clearly lower illumination level in the FIG. 13b), may be used for indicative or decorative figures, for example. Suitable applications include e.g. logos for mobile terminals, PDAs, wrist computers, watches, laptops, various products of the automotive industry, etc.

Figure 14:
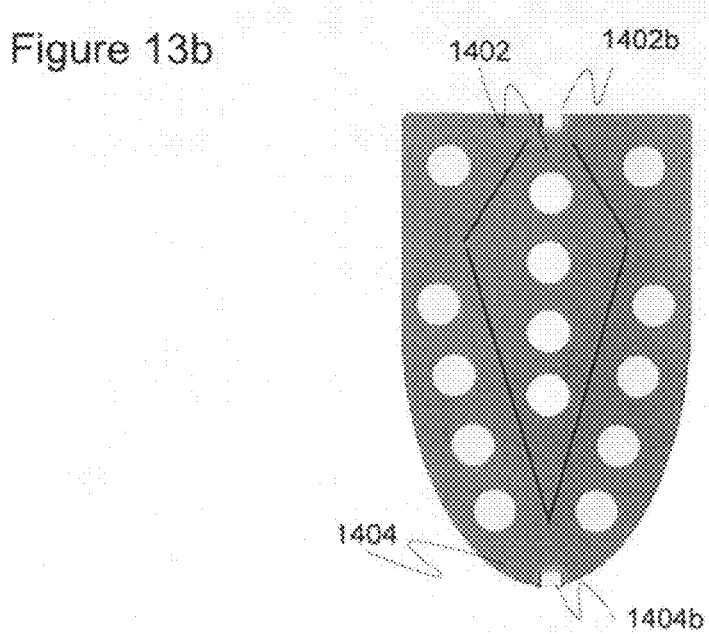
FIG. 14 illustrates an embodiment of the present invention including segmented illumination areas.

FIG. 14 discloses an embodiment of a single lightguide having two or more segmented illumination areas 1402, 1404 and each having individual LEDs 1402b, 1404b and discrete illuminated patterns. Each LED (color) illuminates only desired discrete areas with discrete patterns. The segmented areas may be formed with die-cut or lasercut lines, which are configured to block the light and avoid color mixing, for example.

Figure 15A:
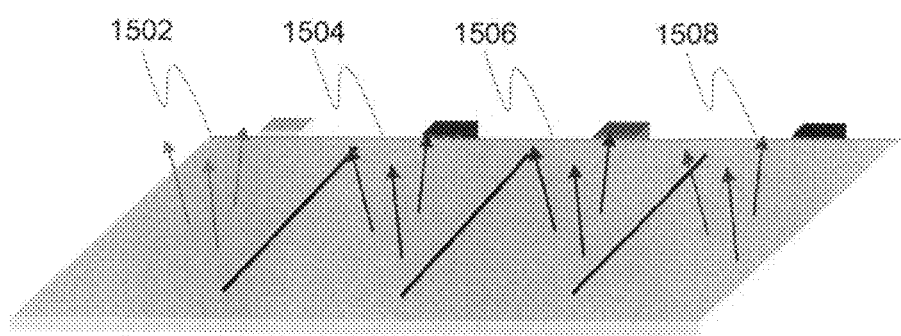
FIG. 15a illustrates an embodiment of a lightguide in accordance of the present invention including multiple illumination areas.
Figure 15B:
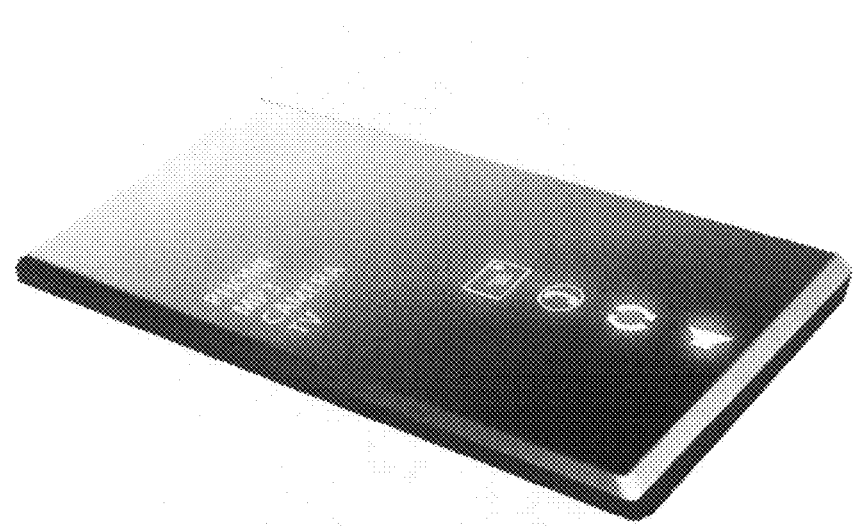

FIGS. 15a and 15b illustrate an embodiment of a single lightguide having several segmented illumination areas 1502, 1504, 1506, and 1508, each having individual LEDs, which are configured to provide active indicative illumination effects via interaction of LEDs and lightguide optics. Indicative illumination figures may be formed by means of discrete surface relief micro optics and/or assisted by means of mask layers. An example of a hand-held apparatus having active indicative illumination (note the symbols that may be individually illuminated) is particularly illustrated in FIG. 15b.

Figure 16A:
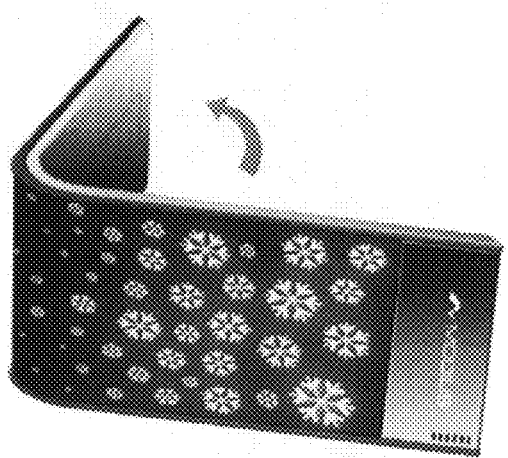
FIG. 16a illustrates an embodiment of the present invention wherein a hand-held apparatus is provided with active decorative and/or indicative illumination effects.
Figure 16B:
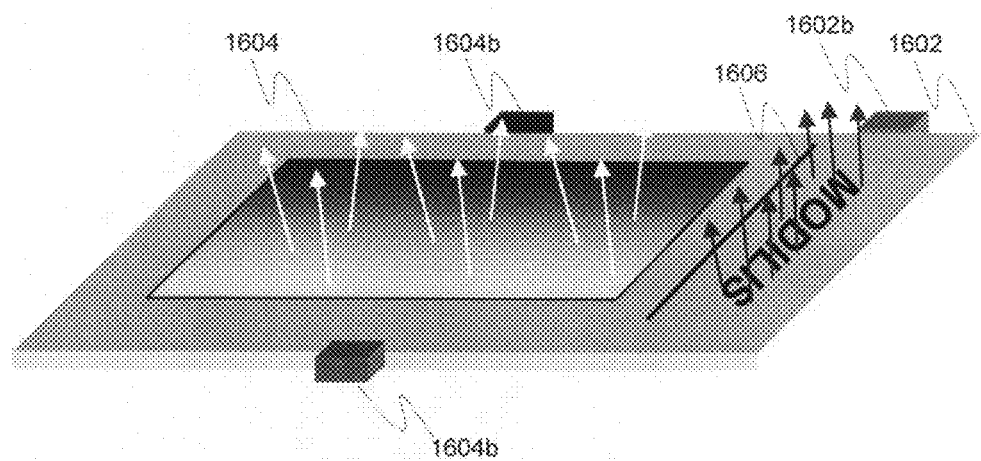
FIG. 16b illustrates one embodiment of a lightguide arrangement for producing active decorative and/or indicative illumination effects.

FIGS. 16a and 16b illustrate embodiments of hand-held apparatus provided with active decorative and/or indicative illumination effects by an adapted single lightguide capable of producing discretely formed illumination patterns by micro-optic surface structures and/or mask layers. Indicative and decorative effects may be individually controlled via interaction of LEDs and segmented lightguide optics. The lightguide may be bendable as visualized in the example of FIG. 16a and explained hereinbefore. Decorative illumination effect may utilize two or more LED colors in order to provide actively changeable color variation such as sliding colors and brightness variation over the illumination area. The effects may be provided via interaction of LEDs and lightguide optics by means of dimming and brightening, for example. In the example of FIG. 16b one segment 1602 including a LED 1602b and micro-optic surface relief patterns and/or mask(s) for creating active shape representing text "Modilis" is provided. Another segment 1604 including two different LEDs 1604b is configured to provide adaptive color mixing. Segments have been generated by a separating line, or slit, 1606.

Figure 17:
FIG. 17 illustrates one embodiment of providing illumination effects via a lightguide included in an electric apparatus.

FIG. 17 illustrates an embodiment in which active decorative and/or indicative illumination effects are achieved with adapted single lightguide provided for a hand-held device. Keypad illumination is provided with continuous or discrete micro optic patters and edge illumination 1702 with light leakage from lightguide.

Figure 18A:
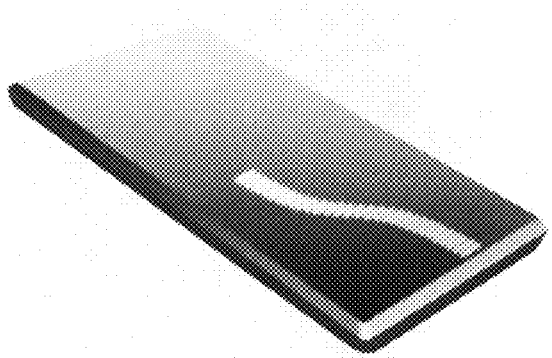
FIG. 18a illustrates one embodiment of lightguide utilization in an apparatus configured to provide active indicative and/or decorative illumination effects.
Figure 18B:
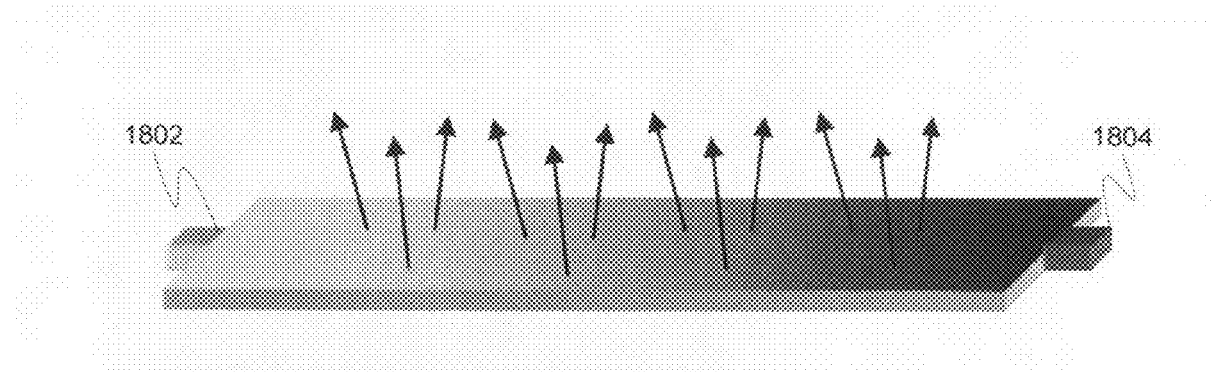
FIG. 18b illustrates one embodiment of producing the effects provided by the embodiment of FIG. 18a via a lightguide and a number of light sources.

FIGS. 18a and 18b illustrate further embodiments of lightguide utilization e.g. in a handheld apparatus having active indicative and/or decorative illumination effects. A single lightguide may be adapted to produce discretely formed illumination patterns optionally assisted by means of mask layers. Active indicative or decorative illumination effect may utilize at least two LEDs and associated colors in order to provide actively changeable color variation, such as sliding colors, gradual color mixing and brightness variation, over the illumination area via interaction of LEDs and lightguide optics by means of dimming and brightening, for example. The top cover of the apparatus may be made e.g. with semi-mirror (PVD coating). Various examples of the applicability of a lightguide having at least two LEDs 1802, 1804 with different colors include status indicators indicative of prevailing battery charge, volume, temperature, incoming calls and messages, connection strength, etc. Lightguides may be provided in rectangular or irregular shapes, for example.

Figure 19A:
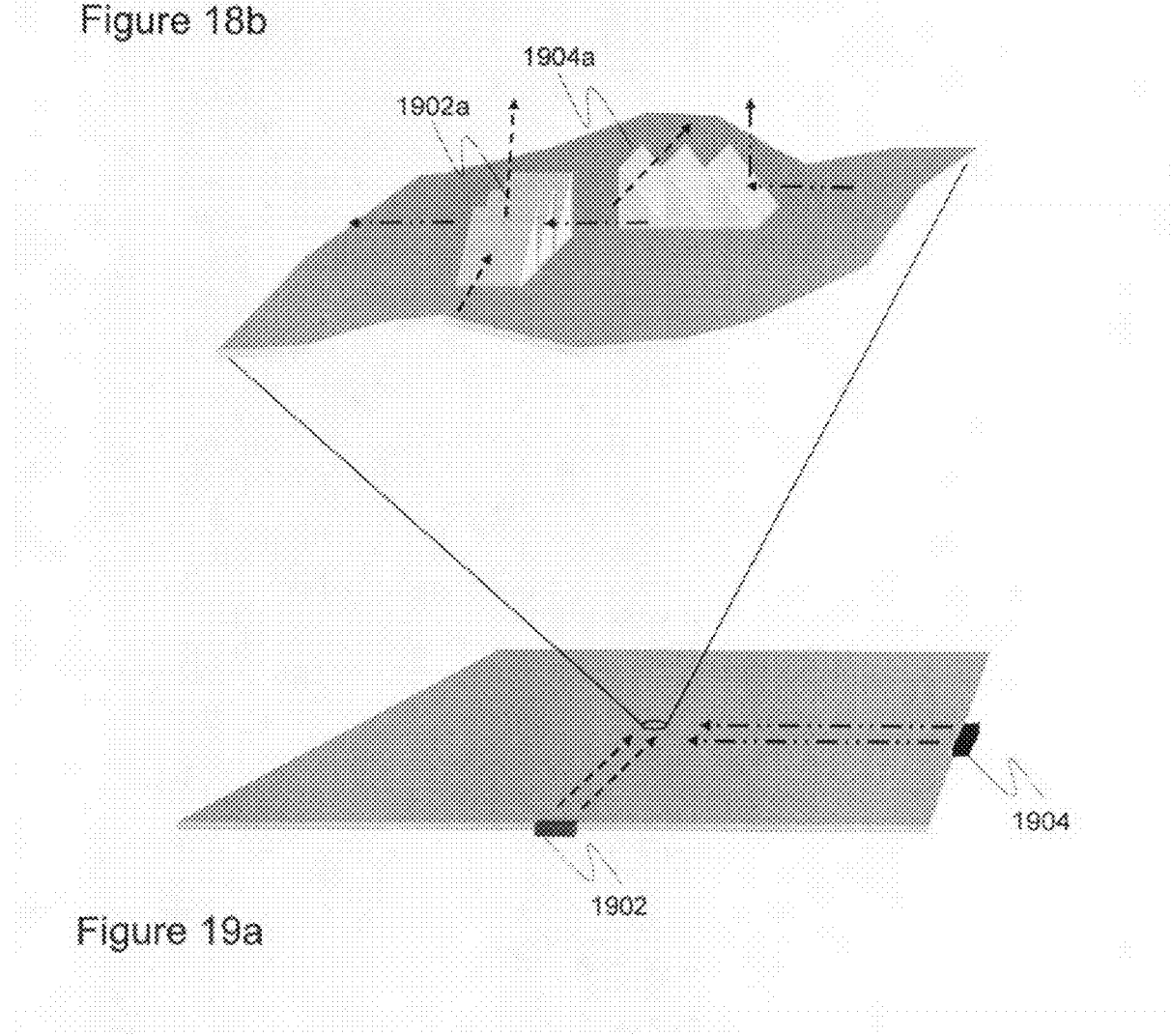
FIG. 19a illustrates one embodiment of a lightguide in accordance with the present invention, wherein different surface relief forms are orientated towards different light sources to provide selective outcoupling.

FIG. 19a illustrates an embodiment of a single lightguide having at least two light direction selective micro optical surface relief patterns 1902a, 1904a, such as blazed or slanted type profiles for active indicative and/or decorative illumination effects in order to utilize individually via interaction of LEDs 1902, 1904, respectively, and lightguide optics utilizing direction of incoupled light and outcoupling patterns. Additionally, this light incoupling and outcoupling solution is suitable for color mixing in order to achieve different colors or adjust a white balance of illumination.

Figure 19B:
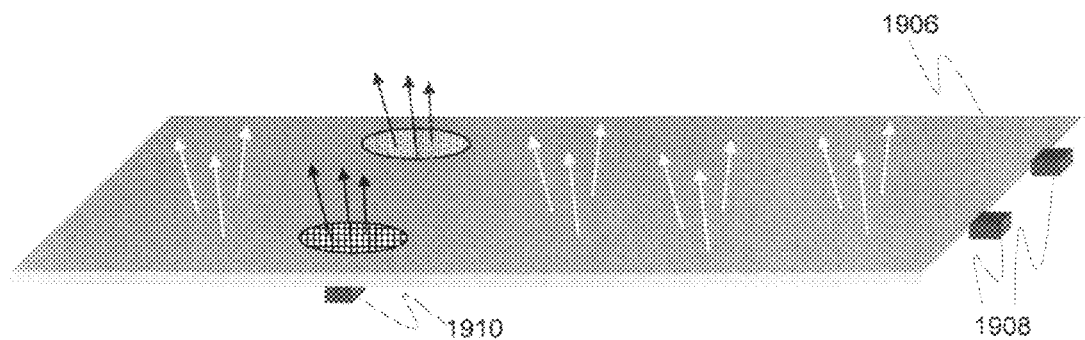
FIG. 19b illustrates one embodiment of a lightguide including multiple illumination areas.

FIG. 19b illustrates an embodiment wherein a single lightguide includes a main multi-color illumination area 1906 with edge placed RGB LEDs 1908 including two different illumination segments associated with under-placed green and red color LED(s) 1910 in order to illuminate desired segments with the constant indicator color. The main illumination area contains micro optical surface relief patterns for light outcoupling and discrete segments having plain surface without any patterns.

Figure 20A:
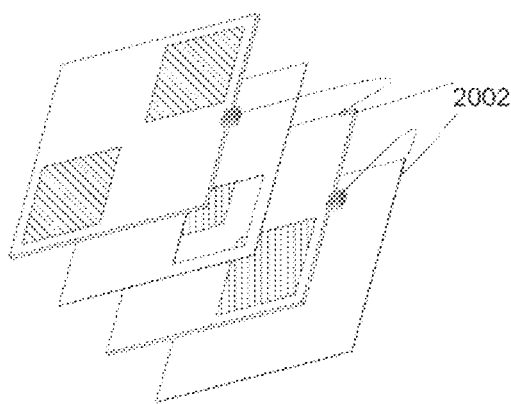
FIG. 20a illustrates one embodiment of a multi-layer lightguide.

FIG. 20a illustrates an embodiment of multi-layer, dual lightguides having individual LEDs 2002, such as multi-color LEDs, for discrete indicative and/or decorative illumination effects via interaction of LEDs and lightguide optics. Individually active illumination is achieved by means of dual lightguide layer typically having at least one masking film between those in order to avoid undesired illumination and light leakage.

Figure 20B:
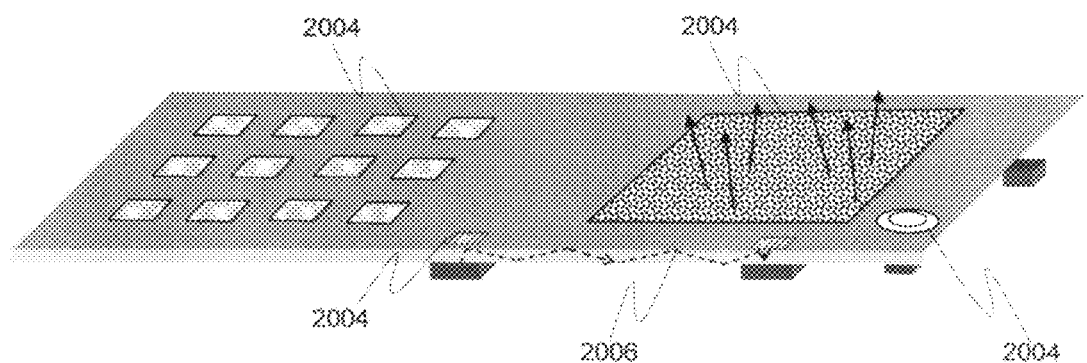
FIG. 20b illustrates one embodiment of "all-in-one" type integrated lightguide.

FIG. 20b illustrates an embodiment of a single lightguide including multi-purpose illumination and optics for indicative, decorative, flash light, display light, optical data transmission 2006 (incoupling for sender and outcoupling for receiver). One, e.g. planar, lightguide may thus have different optical surface relief patterns 2004 for each purpose, integrated solution ("all-in-one") with low cost manufacturing benefits, for example.

The various embodiments of the present invention may be cleverly adapted and combined as desired as being appreciated by persons skilled in the art. For example, the various lightguide arrangements may be utilized in the keypad assembly of the invention in which case also the suggested, improved roll-to-roll embossing with associated two- or three-layer lightguide structure may be applied for manufacturing the lightguide. Accordingly, the lightguide may be constructed as multi-purpose version and then integrated with a further, application-specific optically functional layer, e.g. the keymat of the keypad assembly.

The scope of the invention is determined by the attached claims together with the equivalents thereof. The skilled persons will again appreciate the fact that the explicitly disclosed embodiments were constructed for illustrative purposes only, and the scope will cover further embodiments, embodiment combinations and equivalents that better suit each particular use case of the invention.

The invention claimed is:

1. A lightguide arrangement, comprising:
a substantially thin lightguide for transporting and coupling light, wherein:
the lightguide comprises a plurality of layers,
a number of the layers varies over the lightguide, and
one or more films are disposed between at least a portion of two adjacent layers among the plurality of layers;
a plurality of light sources coupled to the lightguide;
a processor controlling multiple of the plurality of light sources; and
a plurality of micro-optic surface relief patterns arranged on the lightguide at respectively different orientations to utilize the plurality of light sources, the lightguide being configured to produce one or more active indicative and/or decorative illumination effects via interaction between said plurality of light sources and said plurality of micro-optic surface relief patterns.

2. The lightguide arrangement according to claim 1, wherein said plurality of micro-optic surface relief patterns is configured to provide at least two illumination levels.

3. The lightguide arrangement according to claim 2, wherein each of the at least two illumination levels vary with time and location.

4. The lightguide arrangement according to claim 1, further comprising a plurality of illumination area segments.

5. The lightguide arrangement according to claim 1, wherein the plurality of light sources are adapted to emit different respective colors.

6. The lightguide arrangement according to claim 1, wherein said lightguide is bendable.

7. The lightguide arrangement according to claim 1, further comprising one or more masks adapted to produce, at least partly, the active indicative and/or decorative illumination effects.

8. The lightguide arrangement according to claim 1, wherein the lightguide is configured to produce one or more active symbols, graphical shapes, letters, or numbers via said interaction.

9. The lightguide arrangement according to claim 1, wherein the lightguide is adapted to transfer data optically between at least two locations on the lightguide.

10. The lightguide arrangement according to claim 1, wherein the respectively different orientations of the surface relief patterns are oriented relative to respective ones of the plurality of light sources to provide light source-selective light outcoupling from the lightguide.

11. The lightguide arrangement of claim 1, wherein the micro-optic surface relief patterns have a height less than or equal to 10 microns.

12. The lightguide arrangement according to claim 1, wherein the one or more films comprise reflector films, diffuser films, prismatic films, or brightness enhancement films.

13. An apparatus comprising:
a lightguide for transporting and coupling light,
wherein the lightguide comprises a plurality of layers, and
wherein a number of the layers varies over the lightguide;
a plurality of light sources comprising at least a first light source coupled to a first layer of the plurality of layers of the lightguide and a second light source coupled to a second layer of the plurality of layers of the lightguide;
a processor controlling the first light source and the second light source; and
a plurality of micro-optic surface relief patterns arranged on at least one of the plurality of layers of the lightguide at respectively different orientations to utilize the plurality of light sources, the lightguide being configured to produce one or more of an indicative illumination effect or a decorative illumination effect via interaction between said plurality of light sources and said plurality of micro-optic surface relief patterns, wherein the lightguide, the first light source, and the second light source are configured to provide color variation, in relation to time and location, on the lightguide in response to the processor control of the first light source and the second light source, the color variation creating a color changing indicator.

14. The lightguide of claim 13, wherein the color changing indicator comprises a bar graph representing at least one of battery charge or connection strength.

15. The apparatus of claim 13, wherein the micro-optic surface relief patterns have a height less than or equal to 10 microns.

16. The apparatus of claim 13 including one or more films arranged in at least a portion of any region between two overlying lightguide layers, the film including one or more of reflector films, diffuser films, prismatic films, or brightness enhancement films.

17. An apparatus comprising:
- a plurality of light sources comprising at least a first light source and a second light source;
- a lightguide comprising a plurality of layers, wherein a number of the layers varies over the lightguide and the lightguide includes at least one layer for illumination of a display and a keypad;
- a plurality of micro-optic surface relief patterns arranged on at least a top layer of the plurality of layers of the lightguide at respectively different orientations to utilize the first light source or the second light source, respectively; and
- a processor controlling the first light source and the second light source for illumination of the display and the keypad.

18. The apparatus of claim 17, wherein the lightguide is configured to produce one or more of an indicative illumination effect or a decorative illumination effect via interaction between said plurality of light sources and said plurality of micro-optic surface relief patterns, wherein the lightguide is configured to produce one or more active symbols, graphical shapes, letters, or numbers via said interaction.

19. The apparatus of claim 17, wherein one or more films are disposed between at least a portion of two adjacent layers among the plurality of layers.

* * * * *